Patented June 4, 1929.

1,716,152

UNITED STATES PATENT OFFICE.

JOSEPH L. ROSENFIELD, OF ALAMEDA, CALIFORNIA.

NUT-MEAT PRODUCT AND PROCESS OF MANUFACTURING THE SAME.

No Drawing. Application filed November 10, 1924. Serial No. 749,027.

My invention relates to a nut meat product and process of manufacturing same.

The primary object of this invention is to produce a nut meat product preferably a so-called spread for bread and to utilize peanuts for the purpose.

Ordinary peanut butter, as heretofore offered to the trade, has been open to many objections, due to its semi-fluid consistency, adhesiveness and the tendency of the oil to separate from the solids and the likelihood of the same to become rancid.

My improved product while containing all of the commercially desirable qualities of peanut butter is improved to the extent that the undesirable qualities are entirely eliminated. Furthermore, since I have been able to produce a product that can be packed in cartons and sold in brick forms, so to speak, the same offers a much more practical product to handle and market.

With these and further features in view, I will now describe the product in detail and the preferred manner of manufacturing the same. In the first place I will deal with peanuts since the same offer the best medium from a marketing point of view. However, I am not limited to the use of peanuts as the same use may be made of other nut meats, such as almonds. First of all in the majority of cases, I will desire to obtain a solid or soldified nut meat mass suitable to be packed in cartons as in the case of ordinary creamery butter. The product in its preferred form should be solid at ordinary house temperature yet soft enough to spread like butter. The desired hardness for different climates or for other reasons may be obtained as will be hereinafter explained.

Using peanuts as an example, the same will be shelled, roasted and blanched in the customary way. After blanching, the peanuts will be chopped up. This is a very important step in the process and must not be confused with the usual grinding step as carried out in the manufacture of ordinary peanut butter. The particular chopping step which I carry out is performed by a machine in which knife blades cut, but do not crush, the peanuts into minute or granulated particles. The peanuts are neither crushed, ground nor mashed, in fact, the cutting or chopping action is such as to liberate or separate only a small portion, if any, of the natural oil content of the peanuts and this small portion will result from bleeding and not from crushing or grinding. Quite naturally, if the peanuts being used contain a large percentage of oil a portion of the oil will be liberated from the severed oil cells. Even in the case of exceptionally oily peanuts the result of the chopping or cutting step will leave dry granulated particles. The liberated oil content in these granulated particles will be slightly noticeable if the cut particles are subjected to an absorbent surface or material. The particles will not adhere in other words, for all intent and purposes, it is really dry granulated nut meat.

With the chopped nut meat as a base, I bring the same to a state of plasticity or solidity with the aid of a suitable binder so as to derive a homogenous plastic or semi-plastic mass capable of being molded and packed in wax cartons or the like. I use the term binder intending to cover several different solidifying agents. For instance, a natural hard oil such as cocoanut oil when mixed with the nut meat base in proper proportions will produce a plastic mass that may be molded, packed in cartons and used as a spread. The existing peanut oil in the chopped peanuts is practically intact so that the rich nutty taste of the peanuts will dominate the resultant product.

As another binder, hydrogenated edible oil may be used in the same capacity as oil above mentioned. This hydrogenated oil may be hydrogenated peanut or other nut oil. In either of the two examples thus far explained, the solidity or hardness of the product may be determined by the amount of hardening oil added.

In lieu of the binders above explained, properly prepared animal fats may be used in the same capacity, in fact animal fat may be used in combination with the hard oils above mentioned.

In any event, I prefer to use an oil and/or fat as a binder with the same either having the natural inherent qualities of rendering the product plastic or else so treated prior to mixing as to be capable of rendering the product plastic.

When I refer to a hard oil or a hard oily binder, I expect the same to be interpreted as a fatty substance, such as animal fat, or a hard oil such as cocoanut oil (vegetable oil) or hydrogenated peanut or other like oil, in fact any edible substance suitable for the purpose and having the inherent qualities of rendering the product plastic or semi-plastic.

It is, of course, understood that I am not concerned with ground peanuts, as the salient features of my process and the product derived therefrom contemplate the use only of cut or chopped nut meat with the cutting or chopping carried out in such a manner to obtain substantially dry granulated particles. While the proportion of granulated nut meat and binder agent will vary according to the product desired, I will refer to a one to three ratio, one part binder agent to three part nut meat. Salt to taste should ordinarily be used.

Although the many advantages of the process may be readily appreciated without the necessity of going into further detail, I might state that the binder seals the severed oil cells of the cut nuts so that the exising oil content will not be liberated and consequently, there is no chance for the same to separate from the solids. The very small percentage, if any, of oil that may bleed from the severed oil cells will be of no consequence particularly if the next step of mixing the binder is carried out without undue loss of time after the cutting step. The reduction of the nut meat by the cutting operation herein described, will preferably be carried on until the meat reaches a degree of fineness corresponding substantially to that of ordinary cornmeal.

Having thus described my invention, I claim:—

1. A nut meat product comprising nut meat cut into small particles, some of the oil cells of said particles being severed, but otherwise intact, the majority of the oil content of the nut meat being retained in said cells, and said nut meat being combined with a hard edible oil having the inherent qualities of rendering the product plastic.

2. A nut meat product comprising nut meat cut into small particles, some of the oil cells of said particles being severed, but otherwise intact, the majority of the oil content of the nut meat being retained in said cells, and said nut meat being combined with an edible fat having the inherent qualities of rendering the product plastic.

3. A nut meat product comprising nut meat cut into small particles, some of the oil cells of said particles being severed, but otherwise intact, the majority of the oil content of the nut meat being retained in said cells, and said nut meat being combined with a hard edible oil and edible fat, having the inherent qualities of rendering the product plastic.

4. The herein described process of manufacturing a plastic nut meat product which consists in cutting the nut meat into small particles without completely destroying the oil cell structure of the nuts, and combining the cut particles with a hard edible oil having the inherent qualities of rendering the product plastic.

5. The herein described process of manufacturing a plastic nut meat product which consists in cutting the nut meat into small particles without completely destroying the oil cell structure of the nuts, and combining the cut particles with an edible fat having the inherent qualities of rendering the product plastic.

6. The herein described process of manufacturing a plastic nut meat product which consists in cutting the nut meat into small particles without completely destroying the oil cell structure of the nuts, and combining the cut particles with a hard edible oil and an edible fat having the inherent qualities of rendering the product plastic.

In testimony whereof, I affix my signature.

JOSEPH L. ROSENFIELD.